(12) United States Patent
Bhagwat et al.

(10) Patent No.: US 7,689,533 B1
(45) Date of Patent: Mar. 30, 2010

(54) METHOD AND APPARATUS FOR USING STORAGE PROPERTIES IN A FILE SYSTEM

(75) Inventors: Samir Bhagwat, Pune (IN); Ganesh Karche, Pune (IN); Sree Hari Nagaralu, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 926 days.

(21) Appl. No.: 11/214,313

(22) Filed: Aug. 29, 2005

(51) Int. Cl.
*G06F 7/00* (2006.01)
*G06F 17/30* (2006.01)

(52) U.S. Cl. .......................... 707/1; 707/200; 707/204
(58) Field of Classification Search ............... 707/1–10, 707/100–104.1, 200–206; 711/111–114, 711/118, 147, 148
See application file for complete search history.

(56) References Cited

U.S. PATENT DOCUMENTS

| | | | |
|---|---|---|---|
| 6,088,693 A * | 7/2000 | Van Huben et al. ............. 707/8 |
| 2003/0018656 A1* | 1/2003 | Schutzman et al. ......... 707/203 |
| 2004/0123063 A1* | 6/2004 | Dalal et al. .................. 711/170 |
| 2005/0138306 A1* | 6/2005 | Panchbudhe et al. ........ 711/162 |

OTHER PUBLICATIONS

William Boswell, Inside Windows 2000 Server, New Riders Publishing (2000) (chapter 12, pp. 1-12, chapter 13, pp. 1-18).*
Chelluri et al., Data classification and management in very large data warehouses, Jun. 21-22, 2001, IEEE, 52-57.*
Joukov et al., Increasing distributed storage survivability with a stackable RAID-like file system, May 9-12, 2005, vol. 1, IEEE, 82-89.*

* cited by examiner

*Primary Examiner*—Jean B Fleurantin
(74) *Attorney, Agent, or Firm*—Moser IP Law Group

(57) ABSTRACT

A method and apparatus of identifying and using storage properties within a file system. In particular, the invention exposes the storage property of an underlying storage volume i.e., mirrored storage, RAID storage, standard storage, archival storage and the like, to the user such that the user may select a volume with appropriate storage capabilities for their files. Furthermore, the storage property of a storage volume is used as a file property within the file system such that files may be organized using the storage property. In another embodiment of the invention, altering the storage property that is used as a file property, automatically moves the file from one storage volume type to another storage volume type in accordance with the selected storage property.

15 Claims, 6 Drawing Sheets

METHOD AND APPARATUS FOR USING STORAGE PROPERTIES IN A FILE SYSTEM

BACKGROUND OF THE INVENTION

1. Field of the Invention

Embodiments of the present invention generally relate to file systems for computer data and, more particularly, to a method and apparatus for exposing a capability of a storage volume used to store files as a property of the files stored on the volume.

2. Description of the Related Art

Computer data within modern computer systems may be stored on a number of volumes under a single file system. Thus, a single computer system may have the capability of storing information in various types of storage volumes including mirrored storage, RAID-5 storage, RAID-3 storage, standard single disk drive storage, archival storage and the like. A single file system executed by the computer may store information across many of these volumes.

Typically, a user is unaware of the storage capabilities of the various volumes that are available by looking at the file system alone. Furthermore, a user is generally unaware of the specific geometry of the file system. As such, the computer system, as configured by an administrator, selects the appropriate storage for a file. The selected storage may not have the storage capabilities that the user would select, if the user had knowledge of other capabilities. As such, a file may be stored in mirrored storage even though a user believes that a RAID-5 storage volume is more appropriate for the file.

Therefore, there is a need in the art for a technique that exposes the storage properties of storage volumes used by a file system to a user such that the user can intelligently utilize the available storage volumes.

SUMMARY OF THE INVENTION

The present invention is a method and apparatus of identifying and using storage properties within a file system. In particular, the invention exposes the storage property of an underlying storage volume i.e., mirrored storage, RAID storage, standard storage, archival storage and the like, to the user as file properties such that the user may select a volume with appropriate storage capabilities for their files. Furthermore, the storage property of a storage volume is used as a file property within the file system such that files may be organized using the storage property. In another embodiment of the invention, altering the storage property that is used as a file property, automatically moves the file from one storage volume type to another storage volume type in accordance with the selected storage property.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
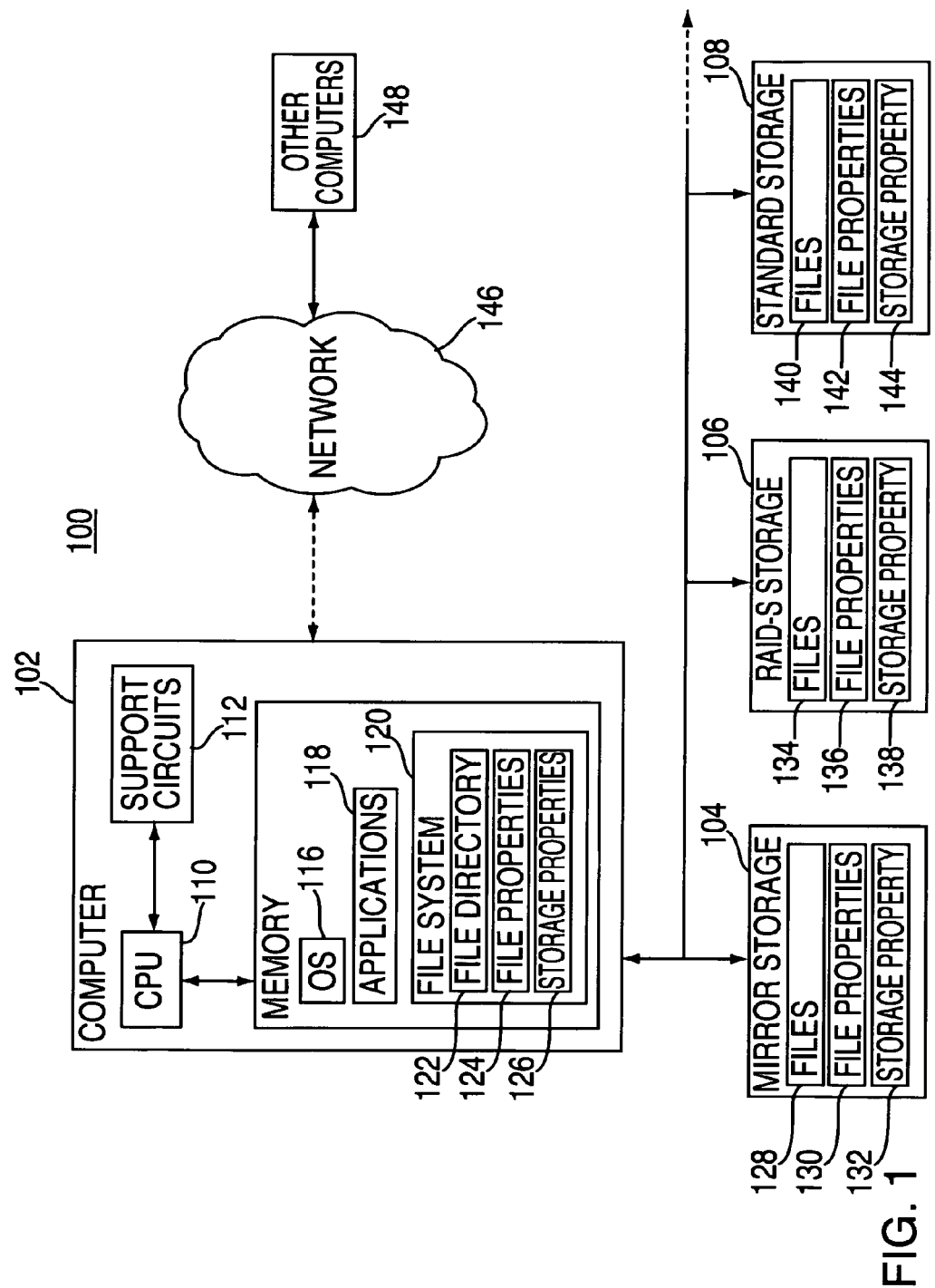
FIG. 1 depicts a block diagram of a computer system that benefits from utilizing the present invention.

FIG. 1 depicts a computer system 100 that utilizes the present invention to improve a file system and enable users to be exposed to the storage volume type that is used for storing files. The computer system 100 comprises a computer 102 that is coupled to a plurality of storage volumes 104, 106, 108. The computer system 102 comprises a central processing unit (CPU) 110, support circuits 112, and a memory 114. The central processing unit 110 comprises one or more microprocessors or microcontrollers. The support circuits 112 operate to support the functionality of the CPU 110 and comprise such well-known circuits as inpuVoutput circuits, dock circuits, power supplies, cache, and the like. The memory 114 comprises random access memory, read only memory, optical storage, removable storage, and combinations thereof. The memory 114 stores various software packages that are executed by the CPU 110 to enable the computer 102 to function. These software packages include an operating system (OS) 116, application software 118, and a file system 120. The operating system is a standard operating system that is generally available such as WINDOWS, SOLARIS, LINUX and the like. The file system 120 comprises at least one file directory 122, file properties 124, and storage properties 126 that are used as a file property. The file system 120 generally contains information that can be accessed by the users to understand the location of the storage of their files. The file system 120 contains a file directory 122 that displays where the files are stored within the various storage volumes 104, 106, and 108 and identifies the capabilities of each of the volumes.

The storage volumes 104, 106, and 108 are examples of the types of storage volumes that can be utilized with a computer system. Those skilled in the art will understand that many other types of storage volumes are available and would find benefit to using the present invention. Storage volume 104 is mirror storage containing files 128, file properties 130, and storage property 132 that identifies the type of storage volume as mirror storage. Similarly, storage volume 106 is a RAID-5 storage volume comprising files 134, file properties 136, and a storage property identifying the volume 106 as a RAID-5 storage volume. A standard storage volume 108, e.g., a single disk drive, comprises files 140, file properties 142, and a storage property 144 identifying the volume 108 as a standard storage volume. Other storage types include, but are not limited to, disk arrays, cache based arrays, JBODS (Just a Bunch of Disks), fast storage, slow storage, tapes, RAM-disks, USB disk drives, SAN, NAS storage, and the like The computer system 100 may have the computer 102 coupled to a communications network 146. The network 146 couples the computer 102 to other computers 148 thus forming a computer network. The network 146 can include one or more various types of networks. Network 146 may include local area networks (LAN) or wide area networks (WAN), such as the Internet, or a combination of one or more of different types of networks. Various media can be used to implement the network 146 including Ethernet links, wireless links, coaxial cables, and the like.

The file system 120 may be distributed across the network to other computer systems such that a distributed file system is created. Under a distributed file system, the invention operates in a substantially similar manner as discussed herein, where the storage properties of the various volumes connected to the various computers within the network are exposed as file properties of the file system as described below.

The file system 120 organizes data into files and/or directories, where a directory is a special type of file. The particular set of one or more directories and/or files that the file system organizes can also be referred to as a file system. In one embodiment, file system 120 is implemented using an application such as a VERITAS file system available VERITAS Software Corporation of Mountain View, Calif. Such as file system from VERITAS executes on a single computing device. In other embodiments, the file system 120 is a distributed file system that is implemented by executing a application such as VERITAS Cluster File System (CFS) on each of several independent computing devices.

Figure 2:
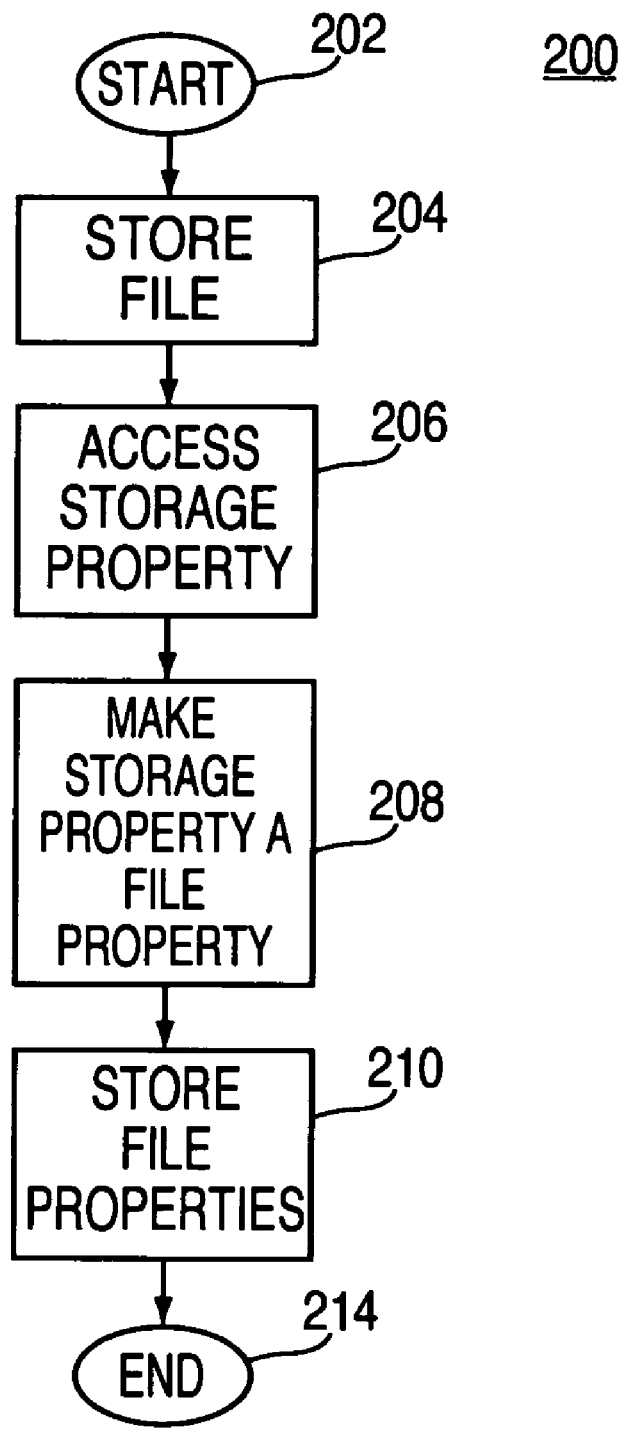
FIG. 2 depicts a flow diagram of a method of storing files using a storage property in accordance with the present intention.

FIG. 2 depicts a flow diagram of a method of utilizing at least one storage property that identifies the type of volume(s) (i.e., the capability of the volume(s)) that are used by a file system. The method 200 begins at step 202 and proceeds to step 204, where a file is stored by a user within a storage volume. The user may select the storage volume that will store the file by type or by location. Alternatively, the volume may be automatically selected by the file system. In a further embodiment, as discussed below with respect to FIG. 7, the volume may be assigned at the time of file creation.

At step 206, the storage property for the selected storage volume is accessed. For example, the storage volume may be accessed as a field within the storage volume controller. This field can be read and used by the file system to identify the type of storage volume that is being used to store the file.

At step 208, the storage property is used as a file property within the file system. Generally, this places the storage property into the metadata that is associated with the file. At step 210, the file property is stored within the file system for subsequent access and utilization by the file system in creating and maintaining file directories. At step 214, the method 200 ends. In this manner, the file system objects, e.g., files and folders, inherit the properties of the storage volumes that are used to store the files and folders. For example, a file residing on a mirrored storage volume is treated as a mirrored file, while a file that is stored in an archival storage volume is treated as an archive file. The files can be listed in directories according to their inherited properties. As such, these properties and the associated capabilities of the available storage volumes are exposed to the users.

Figure 3:
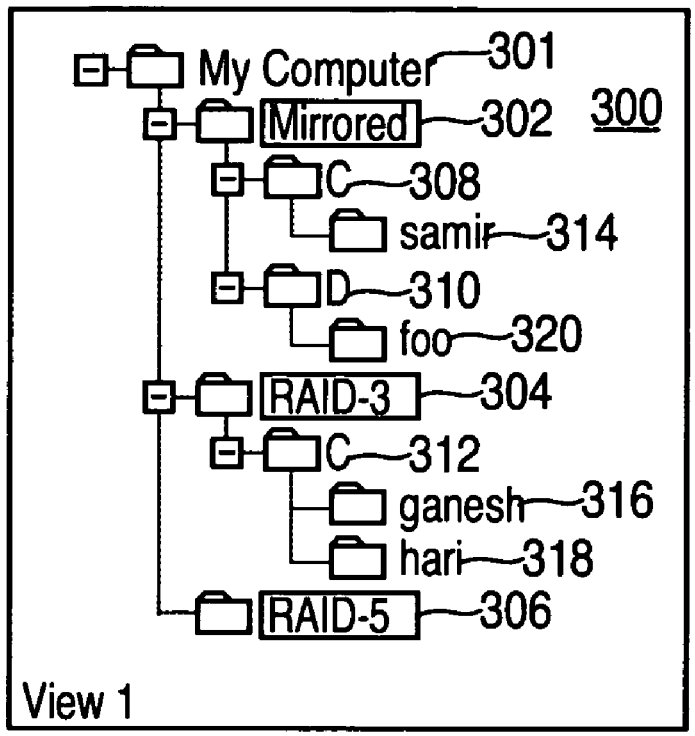
FIG. 3 is a first view of a file system organized in accordance with the storage properties of the files.

FIG. 3 depicts an exemplary directory that is formed in accordance with the present invention. The information that is stored in root directory MY COMPUTER 301 is stored in three different volumes: a mirrored volume 302, a RAID-3 volume 304, and a RAID-5 volume 306. The specific volumes used in the mirrored volume include volume C 308 and volume D 310 that contain files Samir 314 and Foo 320. Similarly, the RAID-3 volume 304 comprises volume C 312 that stores the files Ganesh 316 and Hari 318.

Figure 4:
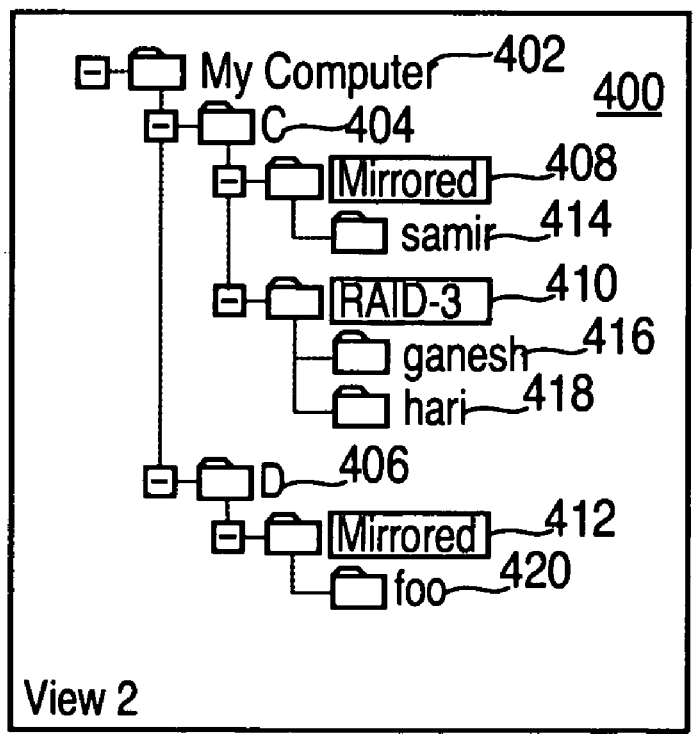
FIG. 4 is a second view of a file system organized in accordance with the storage properties of the files.

FIG. 4 depicts another view of the same file system as FIG. 3. In FIG. 4, the various capabilities are organized in accordance with the file system such that the MY COMPUTER directory 402 depicts volume C 404 and volume D 406 and shows that each of these volumes provide two different types of storage capabilities including mirrored storage 408, RAID-3 storage 410 for volume C and mirrored storage 412 for volume D. As in the prior view of FIG. 3, the Foo file 420 appears under the D volume 406, while the Ganesh 416 and Hari 418 files are contained in the RAID-3 volume 410. The mirrored volume 408 contains the Samir file 414 in volume C 414. By using the storage property of each volume, various directory views can be created to clearly depict the storage capabilities that are available to the user.

Figure 5:
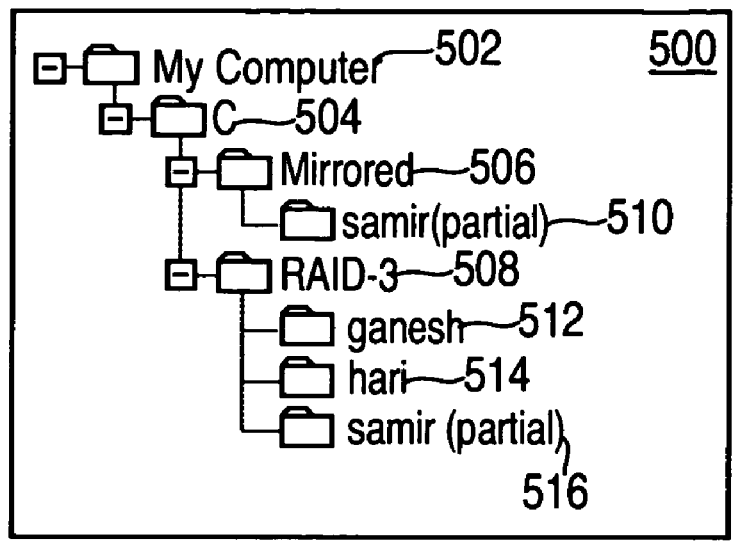
FIG. 5 depicts a third view of a file system organized in accordance with the storage properties of the files.

In some instances, various portions of files or folders may be stored in different types of volumes. For example, metadata of a file may be stored on a mirrored storage volume, while the actual data of the file is stored in a RAID-5 volume. In another example, the header of a database may be stored in a RAID-5 volume and the database itself may be stored in a mirrored storage volume. In these situations, a different view may be generated to depict the partial storage of files as stored on different volumes. FIG. 5 depicts one such view of files utilizing partial storage. In this view, the MY COMPUTER directory 502 has the Samir file divided between Samir (partial) 510 that is stored in mirrored volume 506 and Samir (partial) 516 that is stored on the RAID-3 volume 508. In this manner, a user may clearly see from their directory structure that their file is divided into two parts stored in two different volumes.

Figure 6:
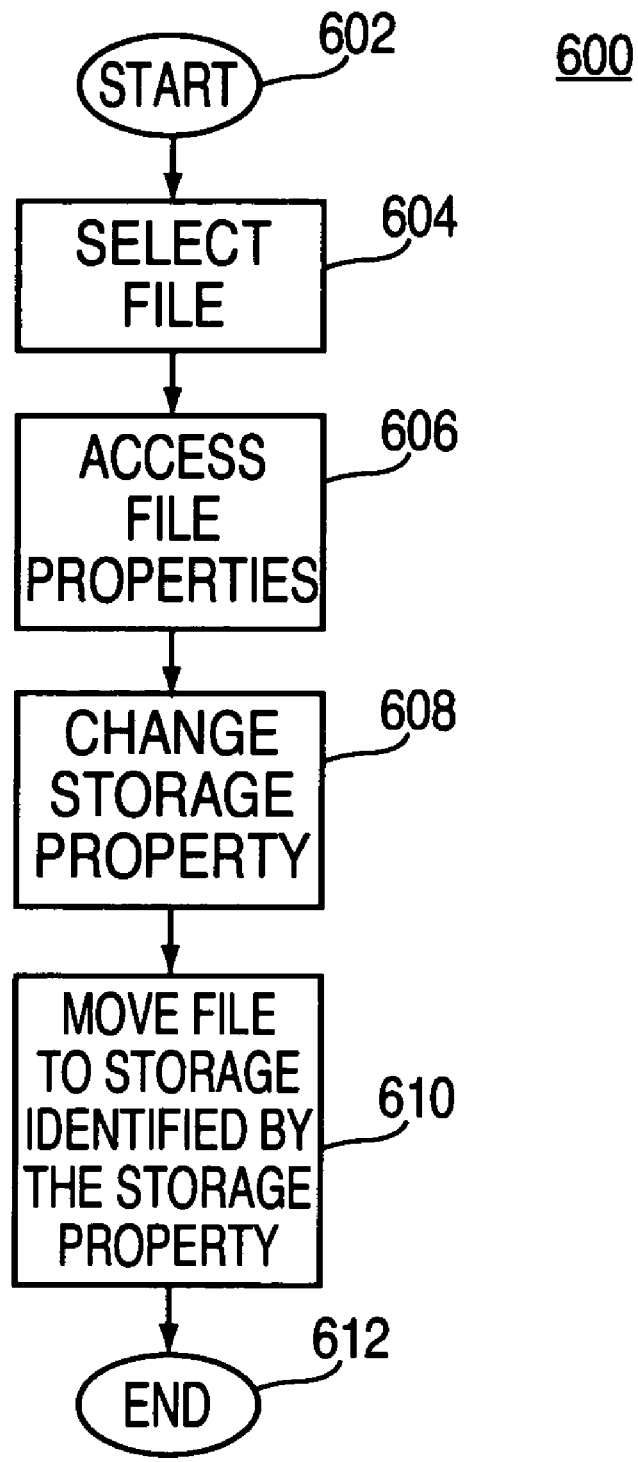
FIG. 6 depicts a flow diagram of a method for changing the storage properties to move a file within a file system.

FIG. 6 depicts a method 600 that utilizes the storage properties of a file to alter a location of storage for the file. The method 600 begins at step 602 and proceeds to step 604, where a user selects a file. At step 606, the file properties for the selected file are accessed and, at step 608, the user changes the storage property for that particular file from a first storage volume type to a second storage volume type, e.g., from a RAID-5 to mirrored.

At step 610, the file system moves the selected file to the storage type identified by the storage property and the method ends at step 612. In this manner, a user may quickly and easily move files from one storage type to another depending on where they would like their files stored. For example, an actively used file may be stored locally on a standard single disk drive storage volume. At some time, the user may want to securely store the file in a RAID-5 volume and can simply adjust the file property to move the file for the standard storage to RAID-5. At sometime in the future, the user may again move the file to an archival storage. In each of these cases where the file is moved, the user merely selects the file, accesses the file properties, and changes the storage property for that file to an appropriate property. The file system moves the file to the appropriate storage volume.

Figure 7:
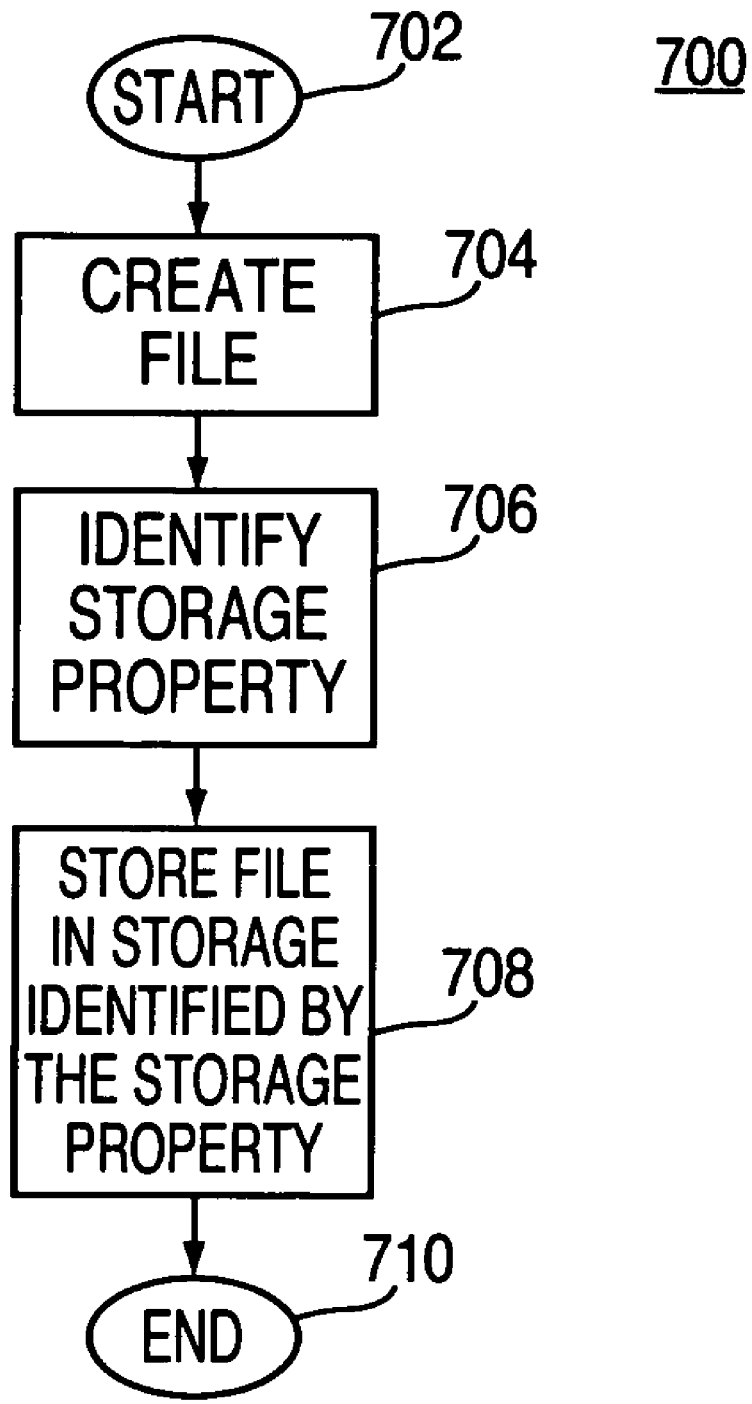
FIG. 7 is a flow diagram of a method for creating a file on a particular storage volume using the storage property.

FIG. 7 depicts a flow diagram of a method 700 for creating files with the storage property identified at the time of file creation. The method 700 starts its step 702 and proceeds to step 704, where a file is created by an application. Upon creation of the file, at step 706, the user is prompted to identify the storage property for that particular file. At step 708, the file is stored in the storage volume identified by the storage property. At step 710, the method 700 ends. In this manner, a file can be created and simultaneously associated with a storage volume.

Figure 8:
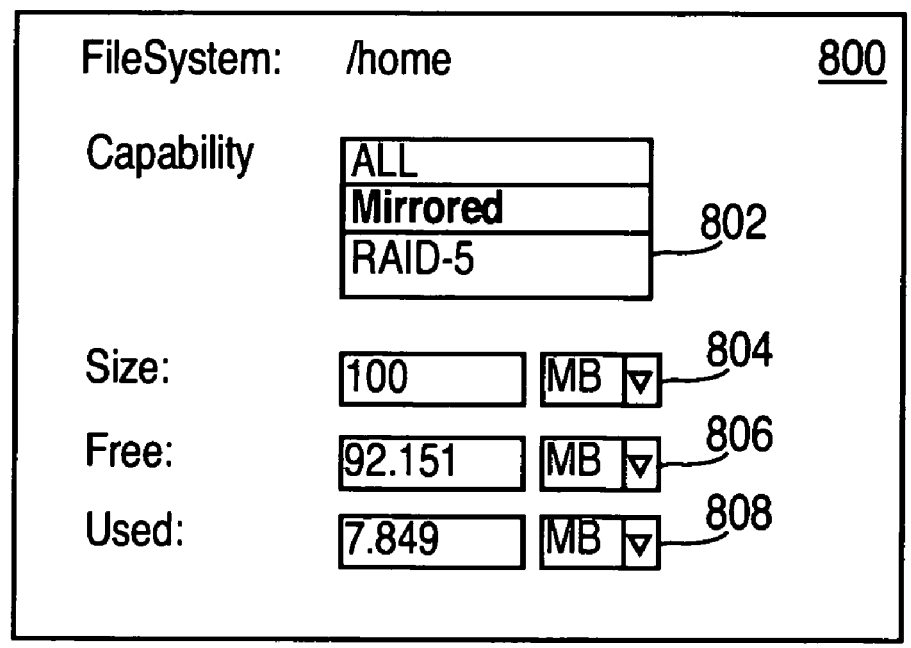
FIG. 8 picks in a display screen that uses the storage property information to depict storage usage and free space within various storage volumes.

FIG. 8 depicts a display of information that can be gleaned from a file system that utilizes the storage property as a file property. By utilizing the information regarding the number of files that are stored under each type of storage property, the file system can create display 800. In display 800, a capability field 802 displays the type of volume information that is being displayed (e.g., mirrored volume), the field 804 displays the total size of the volume, field 806 displays the free space available within the volume, and field 808 displays the amount of space that has been used within the volume. In this manner, a user may monitor the amount of available storage with respect to each available volume storage type.

While the foregoing is directed to embodiments of the present invention, other and further embodiments of the invention may be devised without departing from the basic scope thereof, and the scope thereof is determined by the claims that follow.

The invention claimed is:

1. A method of using storage properties in a filing system, the method comprising:
   exposing a storage property to a user using a computer, where the storage property identifies at least one volume capability of at least one storage volume that is accessible to a file system;
   selecting, responsive to the storage property, at least one of the at least one storage volume for storing at least one file;
   associating the storage property with the at least one file; and
   storing, using the computer, the at least one file on the at least one of the at least one storage volume; and
   wherein the exposing step further comprises: creating a directory that identifies file storage organized by volume capability.

2. The method of claim 1 wherein the associating step further comprises making the storage property a property of the at least one file.

3. The method of claim 1 wherein the at least one volume capability is at least one of RAID storage, mirrored storage, archive storage, disk arrays, cache based arrays, JBODS (Just a Bunch of Disks), fast storage, slow storage, tapes, RAM-disk, USB disk drives, SAN, or NAS storage.

4. The method of claim 1 further comprising, for the at least one volume capability, displaying an indicia of storage capacity.

5. A method of storing a file comprising:
   storing, using a computer, a file in a selected storage volume that is accessible to a file system;
   accessing a storage property of the selected storage volume, where the storage property identifies the storage capability of the selected storage volume;
   making the storage property a file property of the file;
   storing the file property within the file system; and
   creating a directory that identifies file storage organized by volume capability.

6. The method of claim 5 further comprising:
   changing the file property to a different storage property; and
   moving the file from the selected storage volume to a storage volume associated with the different storage property.

7. The method of claim 5 wherein the volume capability is at least one of RAID storage, mirrored storage, archive storage, disk arrays, cache based arrays, JBODS (Just a Bunch of Disks), fast storage, slow storage, tapes, RAM-disks, USB disk drives, SAN, or NAS storage.

8. The method of claim 5 further comprising, for the volume capability, displaying an indicia of storage capacity.

9. A method of storing a file comprising:
   creating, using a computer, a file for storage in a selected storage volume that is accessible to a file system;
   accessing a storage property of the selected storage volume, where the storage property identifies a storage capability of the selected storage volume;
   making the storage property a file property of the file;
   storing the file property within the file system; and
   creating a directory that identifies file storage organized by volume capability.

10. The method of claim 9 further comprising:
    changing the file property to a different storage property; and
    moving the file from the selected storage volume to a storage volume associated with the different storage property.

11. The method of claim 9 wherein the storage capability is at least one of RAID storage, mirrored storage, archive storage, disk arrays, cache based arrays, JBODS (Just a Bunch of Disks), fast storage, slow storage, tapes, RAM-disks, USB disk drives, SAN, or NAS storage.

12. The method of claim 9 further comprising, for the volume capability, displaying an indicia of storage capacity.

13. Apparatus for storing information comprising:
    a computer coupled to a plurality of storage volumes, where each storage volume has a different capability and said capability is identified by a storage property; and
    a file system, executing on said computer, for (i) exposing the storage property to at least one user using a directory that identifies file storage organized by volume capability, (ii) making the storage property a file property of at least one file and (iii) storing the file property within the file system.

14. The apparatus of claim 13 wherein the capability is at least one of RAID storage, mirrored storage, archive storage, disk arrays, cache based arrays, JBODS (Just a Bunch of Disks), fast storage, slow storage, tapes, RAM-disks, USB disk drives, SAN, or NAS storage.

15. The apparatus of claim 13 further comprising, for each of the different capabilities, a display an indicia of storage capacity.

* * * * *